(12) United States Patent
Ludington et al.

(10) Patent No.: US 7,068,883 B2
(45) Date of Patent: Jun. 27, 2006

(54) SYMMETRIC, BI-ASPHERIC LENS FOR USE IN OPTICAL FIBER COLLIMATOR ASSEMBLIES

(75) Inventors: Paul D. Ludington, Brockport, NY (US); Joseph R. Bietry, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 178 days.

(21) Appl. No.: 10/261,986

(22) Filed: Oct. 1, 2002

(65) Prior Publication Data

US 2004/0062478 A1 Apr. 1, 2004

(51) Int. Cl.
*G02B 6/32* (2006.01)

(52) U.S. Cl. ............................. 385/33; 385/34; 385/35; 385/55; 385/61

(58) Field of Classification Search ............ 385/33–35, 385/55, 61
See application file for complete search history.

(56) References Cited

U.S. PATENT DOCUMENTS

| 3,941,474 | A | 3/1976 | Kitano et al. ................. 350/96 |
|---|---|---|---|
| 4,421,383 | A | 12/1983 | Carlsen .................. 350/96.21 |
| 4,426,474 | A | 1/1984 | Sommer et al. ............ 524/243 |
| 4,953,937 | A | 9/1990 | Kikuchi et al. |
| 5,301,249 | A | 4/1994 | Hamblen et al. ............. 385/31 |
| 5,815,614 | A | 9/1998 | Pan |
| 6,005,998 | A | 12/1999 | Lee |
| 6,312,163 | B1 * | 11/2001 | Ono et al. ..................... 385/70 |
| 6,396,630 | B1 * | 5/2002 | Stiens et al. ................ 359/498 |
| 6,438,290 | B1 * | 8/2002 | Bietry et al. .................. 385/33 |
| 6,568,074 | B1 * | 5/2003 | Shahid ........................ 29/850 |
| 2001/0026660 | A1 * | 10/2001 | Asakura et al. ............... 385/47 |
| 2002/0080831 | A1 * | 6/2002 | Goodman ...................... 372/6 |
| 2002/0131699 | A1 * | 9/2002 | Raguin et al. ................ 385/33 |
| 2003/0044118 | A1 * | 3/2003 | Zhou et al. ................... 385/43 |
| 2003/0142914 | A1 * | 7/2003 | Jewell et al. ................. 385/49 |
| 2004/0022504 | A1 * | 2/2004 | Hurley et al. ............... 385/109 |

FOREIGN PATENT DOCUMENTS

| DE | 10054552 | 1/2000 |
|---|---|---|
| EP | 1168012 | 6/2001 |
| WO | WO 97/33189 | 3/1997 |

OTHER PUBLICATIONS

Kodak Optical Products—A414 Glass Collimator Lens, Optical Design Specifications, Rev. May 1999.
Kodak Optical Products—A-439 Micro-Aspheric Coupling Lens—Glass, Rev. Apr. 2001.

* cited by examiner

*Primary Examiner*—Michael G. Lee
*Assistant Examiner*—Allyson N Trail
(74) *Attorney, Agent, or Firm*—William R. Zimmerli

(57) ABSTRACT

A fiber optic apparatus comprising a biconvex optical lens having two equivalent aspheric optical surfaces; an optical fiber approximately located at one of a front focal plane and a back focal plane of the optical lens; and a structure positioned relative to the optical lens and the optical fiber, wherein the structure maintains the position of the optical lens relative to the optical fiber.

27 Claims, 9 Drawing Sheets

SYMMETRIC, BI-ASPHERIC LENS FOR USE IN OPTICAL FIBER COLLIMATOR ASSEMBLIES

CROSS REFERENCE TO RELATED APPLICATIONS

Reference is made to commonly assigned co-pending application Ser. No. 10/262,233 filed concurrently herewith entitled SYMMETRIC, BI-ASPHERIC LENS FOR USE IN TRANSMISSIVE AND REFLECTIVE OPTICAL FIBER COMPONENTS in the name of Ludington et al.

FIELD OF THE INVENTION

This invention relates to an apparatus and method of connecting optical fibers. In particular, it relates to lenses used in optical fiber collimator assemblies, and to the design of such lenses so as to permit improved packaging of optical fibers, lenses, and related components.

BACKGROUND OF THE INVENTION

In optical fiber applications, it is often necessary to couple light from one fiber into another. This might be done at a switching device where multiple fibers are brought together or by adding and/or dropping wavelengths in a dense wavelength division multiplexing (DWDM) application. A known way to do this is by directly butting the fibers together. The fibers can also be joined by electrical fusion, where an electric arc is used to heat the ends of the two fibers as they are brought into contact. The electric arc melts the fibers, causing them to join in a permanent and mechanically stable joint. It is also possible to use lenses to couple the light from one fiber into another, as described in U.S. Pat. No. 4,421,383. Here, a physical connector holds the fiber and lenses in appropriate positions relative to each other.

In many applications, it is desirable to perform processing or manipulation of the light after the light exits the source fiber and before it enters the receiving fiber. Examples of this processing include attenuation and filtering. In optical communication systems that utilize multiple wavelengths on one fiber, commonly referred to as wavelength division multiplexing, an erbium-doped fiber amplifier is used to optically amplify the optical signal in the fiber over a broad wavelength range. Since each wavelength in a wavelength division multiplexed system comes from a different source, the signal power at each wavelength may need to be adjusted for optimum operation of the optical amplifier. The adjustment of the signal power requires variable optical attenuation of the optical signal, and this attenuation is often most easily performed on an expanded beam.

Additionally, processing of the optical signal between fibers is most easily performed if the optical beam from the fiber has also been collimated. FIG. 1 shows an example of a pair of conventional collimating lenses 16 and 18 being used to couple light from a source fiber 10 into a receiving fiber 20. It is known in the art that gradient index (GRIN) lenses are commonly used for this application. GRIN lenses are made by diffusing a dopant into a cylindrical glass body. The dopant produces a radial gradient in the refractive index of the lens. If the refractive index is lower towards the periphery of the lens, then the lens will focus light from a distant source. The shape of the refractive index profile controls the imaging properties of the lens. After diffusion, the lenses are cut to a specific length and the ends are polished. When the light is collimated between the lenses, the beam stays nearly the same size over an appreciable working distance "D" (typically 10's of millimeters). Since the beam is nearly the same size in this space, it is easier to put additional optical components that either attenuate or filter the beam, such as, for example, the optical modulator 17 shown in FIG. 2. The optical system shown in FIG. 2, is known as a transmissive system because the beam transmits through the optical components.

In systems involving the processing of optical signals, it is desirable to maintain as much signal power as possible when coupling the optical signal from one fiber to another. For the case of single mode optical fiber, the coupling efficiency can be computed by analytical methods. (See R. E. Wagner and J. Tomlinson, "Coupling efficiency of optics in single-mode fiber components," Applied Optics, vol. 21, No. 15, 1982, pg 2671). For the case of coupling light from one fiber to the other, the lenses must be of a specific optical function in order to produce high coupling efficiency. Referring to FIG. 2, a second collimating lens 18 produces a focused beam that is directed towards receiving fiber 20. The percentage of light coupled into the receiving fiber will be reduced by any aberrations in the focused beam. Loss of optical power in a fiber system is highly undesirable, as it can limit the amount of information that can be transferred over a communication channel or increase the amount of required amplification.

Recently, more optical fiber based communication systems utilize multiple wavelengths at one time in order to increase the quantity of information carried. The general concept of using multiple wavelengths is referred to as wavelength division multiplexing. Wavelength division multiplexing systems use a method to separate out signals of different wavelengths present in the optical fiber, as shown in FIG. 3. A source fiber 22 is located near the back focal plane of a collimating lens 16. Light from the source fiber is collimated by lens 16 and directed at an optical filter 24. A coating of the optical filter is constructed to reflect all light except that light in a very narrow wavelength band centered around a desired wavelength. Light that passes through filter 24 is coupled into a receiving fiber 28. If filter 24 is aligned correctly, light reflected from the filter will be directed onto the end of a second receiving fiber 26. Note that fibers 22, 26, and 28 are located off the optical axis of the system. The optical system comprising source fiber 22, collimating lens 16, optical filter 24, and receiving fiber 26 is known as a reflective system, whereas the optical system comprising source filter 22, collimating lens 16, collimating lens 18 and receiving fiber 28 is known as a transmissive system.

To achieve high coupling efficiency of a beam into an optical fiber, it is not sufficient that the beam be focused onto the fiber with a low amount of aberration. More specifically, the focused beam must match the fundamental mode of the fiber. This requires that the beam be of the same amplitude and phase of the fiber mode. To match the phase distribution of the fiber, the beam should enter the fiber along the optical axis of the fiber, or additional loss will result. If the end face of the fiber is perpendicular to the optical axis of the fiber, then the beam must be perpendicular to the fiber for the highest coupling efficiency. For a normal imaging system, the condition of a beam being parallel to an axis of the system is referred to as telecentricity. More specifically, telecentricity in a normal imaging system requires that the chief ray, which is the ray traveling through the center of the stop, be parallel to the optical axis at some point in the system. For a single element optical system, the aperture stop should be located at or near the front or back focal plane of the lens. An optical system may be telecentric at different portions of the optical system. If the chief ray were parallel to the optical axis in object space, one would consider the system to be telecentric in object space. If the chief ray were parallel to the optical axis in image space, one would consider the system to be telecentric in image space. For example, FIG. 4 shows a simplified system of a lens 40 and a stop 42 wherein the system is telecentric in object space. FIG. 5 shows a similar system of a lens 50 and a stop 52 that is telecentric in image space.

Due to the nature of the fiber source, the beam coming from an optical fiber would normally be considered to be telecentric in object space, as that beam emerges from the fiber parallel to the optical axis. It is a desirable feature of the optical system for coupling fibers that the light is also telecentric in image space of the second collimating lens, in order to achieve the highest coupling efficiency of light into the receiving fiber, which is located in image space. If the light enters the optical fiber at a substantial angle to the axis of the optical fiber, then the coupling efficiency of the beam into the fiber will be significantly reduced, or the insertion loss will be increased. Although it may be possible to tilt fibers from the optical axis in order to reduce the effective angle between a beam and the optical axis of the fiber, tilting fibers can greatly increase the time and cost of assembling the final optical system. The location and type of the optical elements, and the location of the aperture stop affect the conditions of telecentricity.

For systems used to couple light from one fiber to another, it is not desirable to have any apertures that limit the beam and thereby reduce optical power. Hence there is often no defined aperture or stop limiting the beam. When there is no physical aperture limiting the beam, telecentricity is determined by the characteristics of the source and receivers in combination with the optical elements. More specifically, if a beam is propagating in the system and it is undesirable to introduce any aperture that would limit the optical beam in any way, then the location of the stop is usually described by the location of where the chief ray crosses the optical axis of the system. The chief ray is defined to be the ray in the center of the beam distribution that is emitted from the source, and hence is not determined by physical apertures in the optical system.

It is known in the art that gradient index (GRIN) lenses can be used to collimate light from optical fibers. Nippon Sheet Glass, Somerset, N.J., makes such lenses. FIG. 6 shows a transmissive optical system using two GRIN collimator lenses. A Gaussian beam emanates from the source fiber 10 and is collimated by GRIN lens 16. The collimated beam 62 is then focused by GRIN lens 18 into receiving fiber 20. The paraxial front focal plane of a lens is located one effective focal length (EFL) from the second principle plane of that lens. The front focal plane 60 of the GRIN lens 16 is located in very close proximity to the front face 64 of that lens. This is because the second principle plane 66 is located inside the GRIN lens. For a reflective system (see FIG. 3) the optical filter 24 should be positioned at the front focal plane 60 of the input collimator lens to achieve maximum coupling efficiency, or minimum insertion loss. The close proximity of the optical filter 24 to the front face 64 of the GRIN lens may be advantageous to assembling a reflective photonic device, such as a DWDM demultiplexer, because the optical filter can be cemented directly to the front face 64 of GRIN lens 16 without incurring excessive insertion loss.

In order to have high coupling efficiency, the focusing lens must not introduce significant aberrations into the beam. For a gradient index lens, the shape of the refractive index profile must be tailored exactly to produce minimal aberrations. The control of the refractive index profile is difficult, since the shape of the profile is controlled only by diffusion of the dopant into the glass. It is a further disadvantage of gradient index lenses that one of the dopants commonly used in the diffusion is thallium. For example, the use of thallium in gradient index lenses is described in U.S. Pat. Nos. 3,941,474 and 4,246,474. Thallium is a toxic metal (even more toxic than lead).

In addition to gradient index glass lenses, previous attempts have used refractive lenses to couple light between fibers, as described in U.S. Pat. No. 4,421,383. However, U.S. Pat. No. 4,421,383 does not disclose the use of aspheric surfaces to improve optical performance, nor is the use of a symmetric bi-aspheric collimator lens discussed. FIG. 7 shows a transmissive optical system using two plano-convex refractive collimator lenses as described in U.S. Pat. No. 6,438,290. A Gaussian beam emanates from the source fiber 10 and is collimated by plano-convex lens 72. The collimated beam 62 is then focused by a second plano-convex lens 74 into receiving fiber 20.

For a plano-convex collimator lens, the front focal plane 82 is also located one effective focal length (EFL) from the second principle plane 80. Because all the optical power is located at surface 78, the second principle plane 80 is located approximately at surface 78. As a result, the front focal plane 82 is located approximately one effective focal length in front of the refractive optical surface 78. FIG. 8 shows a reflective system using a pair of plano-convex collimator lenses. The optical filter 24 must be positioned at the front focal plane 82 of the input collimator lens 72 to achieve maximum reflected light into receiving fiber 26. The relatively large distance from the front refractive surface 78 to the optical filter 24 may be perceived as a disadvantage in a reflective system because of positional changes in the optical filter (or mirror) during temperature changes. Reflected coupling efficiency is defined as the fraction of light that is coupled into the receiving fiber 26, assuming the optical filter (or mirror) 24 is perfect reflector. Reflected insertion loss quantifies the amount of light that is lost in a reflected optical fiber component.

Light that is reflected back into the source fiber from Fresnel reflections is known as return loss or back-reflection. Very small amounts of back-reflected light can cause serious performance degradation in the laser-diode source. To reduce this effect, it is well known in the art to polish an inclined facet on both the fiber and the collimator lens, as well as applying a high-efficiency antireflection coating to the fiber facet and lens surfaces. FIG. 9(a) shows a source fiber 100 with a polished inclined facet 102 and a GRIN lens 104 with a similar inclined facet 106. FIG. 9(b) shows a similar configuration for a plano-convex collimator lens 110 with an inclined facet 108. It is well known that an 8 degree inclined facet on the source fiber and collimator lens will produce acceptably small amounts of back-reflection.

The optimum design of a collimator lens is determined primarily by the index of refraction of the lens. The shape of the collimating lens and the ratio of the each radii of curvature is typically chosen to minimize $3^{rd}$ order spherical aberrations. For index of refractions less than approximately 1.68, the optimum optical design is a bi-convex lens as shown in FIG. 10(a). The lens 122 focuses a collimated beam 120 down to a focal plane 124. If the index of refraction is approximately 1.68, then a plano-convex lens shape 126 is optimum (FIG. 10(b)). Finally, for index of refraction greater than approximately 1.68, a meniscus lens shape 128 is desired (FIG. 10(c)).

Additional optical wavefront performance can be achieved by using one or two aspheric optical surface. It is time consuming and costly to fabricate aspheric optical surfaces using traditional grinding and polishing. For high volume applications, molding of aspheric surfaces in glass or plastic is desirable. Several companies, for example, Lightpath Technologies and Hoya, manufacture a wide range of glass-molded, bi-aspheric collimator lenses. In each case, the shape of the lens and the ratio of the radii of curvature are typically chosen to maximize optical wavefront performance. Normally a symmetric bi-convex shape would not be chosen to minimize the $3^{rd}$ order spherical aberrations of a collimator lens.

Eastman Kodak Co. commercially sells two glass-molded, symmetric bi-aspheric lens for use in collimating light from laser diodes that each contain a cover glass. The A-414 lens has a focal length of 3.30 mm, whereas the A-439 has a focal length of 0.71 mm. In both cases, the lenses were not designed to be telecentric.

Additionally, U.S. Pat. No. 5,301,249 describes the use of mirrored systems to couple light from a laser diode into a fiber. However, this patent does not quantitatively describe expected single-mode coupling efficiencies, nor does it describe off-axis performance of the system. As such, there is a need for a lens that can be used in optical fiber collimator assemblies that improve the packaging of these assemblies.

DISCLOSURE OF THE INVENTION

A fiber optic apparatus comprising a biconvex optical lens having two equivalent aspheric optical surfaces; an optical fiber approximately located at one of a front focal plane and a back focal plane of the optical lens; and a structure positioned relative to the optical lens and the optical fiber, wherein the structure maintains the position of the optical lens relative to the optical fiber.

A fiber optic apparatus comprising a number of biconvex optical lens having two equivalent aspheric optical surfaces; a number of optical fibers approximately located at one of a front focal plane and a back focal plane of the optical lenses, the number of optical fibers being equal to the number of biconvex optical lenses; and a structure positioned relative to the optical lenses and the optical fibers, wherein the structure maintains the position of the optical lenses relative to the optical fibers.

BRIEF DESCRIPTION OF THE DRAWINGS

In the detailed description of the embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art. In the discussion, we will assume that we are using single-mode optical fibers, although those skilled in the art will realize the advantages of the present invention apply to the use of the invention with multi-mode fibers, polarization maintaining fibers, and doped fibers.

Figure 7:
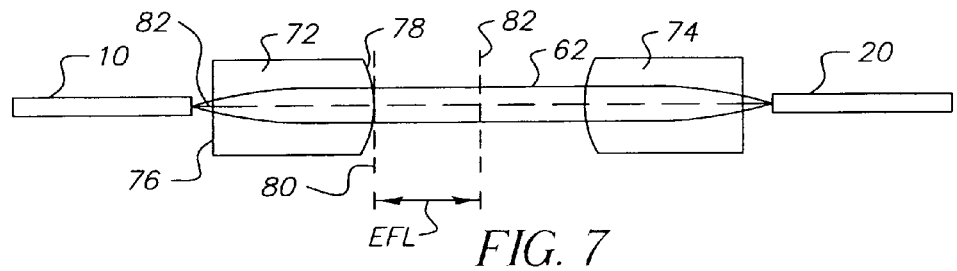
FIG. 7 shows a pair of plano-convex collimator lenses being used to couple light from a source fiber into a receiving fiber.
Figure 8:
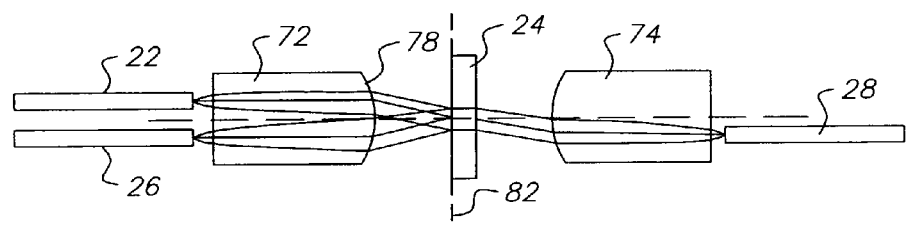
FIG. 8 shows an optical system comprised to two plano-convex collimator lenses and an optical filter.
Figure 11:
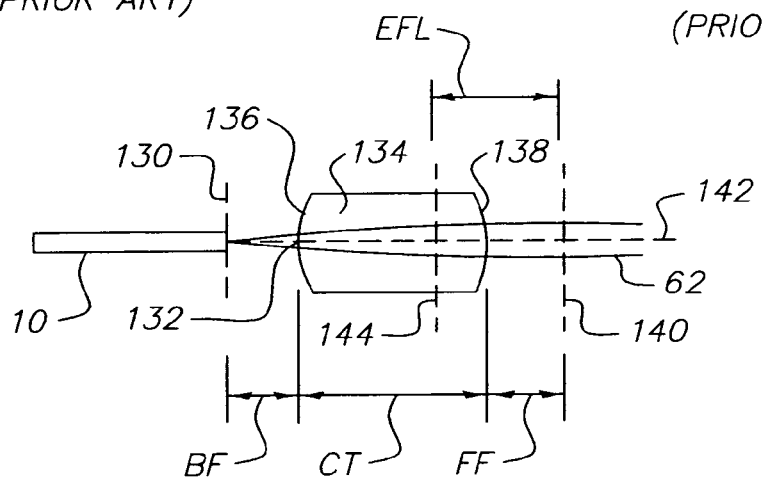
FIG. 11 shows a symmetric bi-convex lens.

Referring to FIG. 11, a source optical fiber 10 is mounted along the optical axis 142 of lens 134, which contains two convex optical surfaces 136 and 138. The first surface 136 and the second surface 138 have the same optical shape. The Gaussian beam emanating from the source fiber 10 is first refracted at surface 136 and then is collimated at surface 138. The size of the collimated Gaussian beam 62 remains essentially constant over some specified distance from lens surface 138. To produce a well-collimated beam, the source fiber 10 must be placed at or near the back focal plane 130 of lens 134. The front focal plane 140 of lens 134 is located one effective focal length from the second principle plane 144 of the lens. The second principle plane 144 is located inside the lens since optical power is present on both the first surface 136 and the second surface 138 of lens 134. As a result the front focal distance "FF" is smaller than an equivalent focal length plano-convex collimator lens as shown in (FIG. 7). For a symmetric design, the back focal length "BF" and the front focal length "FF" are equivalent. The effective focal length, EFL, of a bi-convex lens 134 is determined by the radii of curvature of optical surfaces 136 and 138, as well as the index of refraction of the lens material and the center thickness, CT, of the lens. For a given index of refraction and a given effective focal length, the radii of curvature of optical surfaces 136 and 138 can be adjusted to increase or decrease the center thickness of the lens. For a given index of refraction and a given effective focal length, there exists a preferable center thickness that maximizes coupling efficiency, or minimizes insertion loss, as described below in relation to Examples 1–4. In the preferred embodiment, the optical fiber is a single-mode optical fiber. In addition, multi-mode, polarization-maintaining, and doped optical fiber can also be used.

Figure 12:
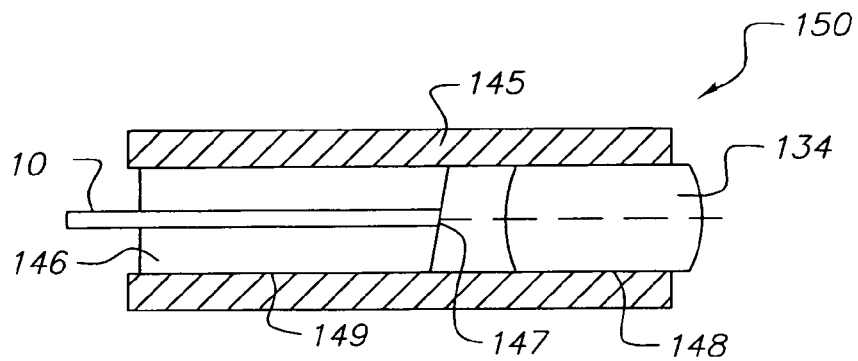
FIG. 12 shows a single-fiber optical collimator assembly.

FIG. 12 shows a preferred embodiment of a single-fiber collimator assembly 150, which is a basic building block for many passive optical fiber devices. Precise alignment of the optical fiber to the collimator lens is critical during the assembly and use of an optical fiber collimator assembly. This is especially true when changes in temperature and humidity occur. The optical fiber 10 is cemented into a precision capillary tube 146 to create what is known in the industry as a fiber pigtail. Typically, the end of the optical fiber 147 is polished at an inclined angle and coated with an anti-reflection optical coating to improve coupling efficiency and reduce back-reflection. The collimator lens 134 and the fiber pigtail are then cemented into a precision cylindrical tube 145. The diameter difference between the lens 134, capillary tube 146 and the mounting tube 145, as well as the bearing length 148 of lens 134 and the bearing length 149 of capillary tube 146, will determine the relative tilt and decentration errors between the optical fiber 10 and collimator lens 134. For maximum coupling efficiency it is important to minimize both the tilt and decentration errors between the optical fiber 10 and the collimating lens 134. One method for reducing tilt and decentration errors is to increase the bearing length 148 of lens 134. This is accomplished by increasing the center thickness of the lens. It is possible to increase the center thickness of the lens to a point without incurring unacceptable coupling efficiency.

Figure 13:
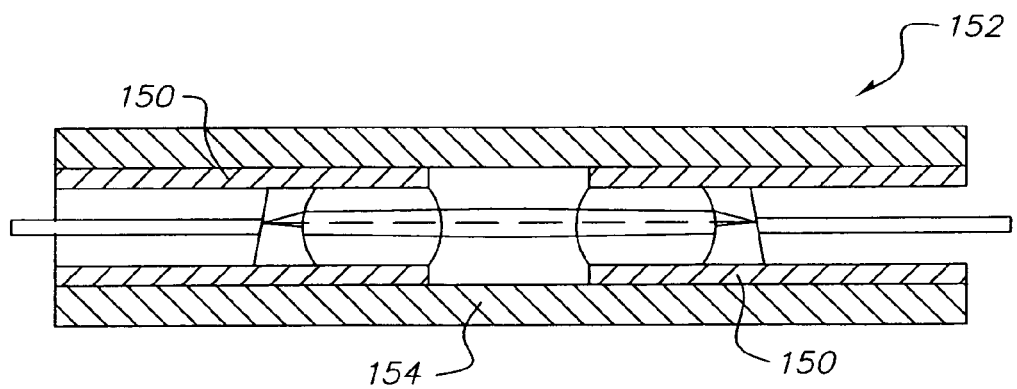
FIG. 13 shows a transmissive system using two single-fiber optical collimator assemblies.

Typically two single-fiber collimator assemblies are used to build a transmissive optical fiber component 152, as shown in FIG. 13. In this case, two single-fiber collimator assemblies 150 are cemented into a cylindrical tube 154. Additional optical components can be placed in the optical beam between the two collimator lenses.

Figure 14:
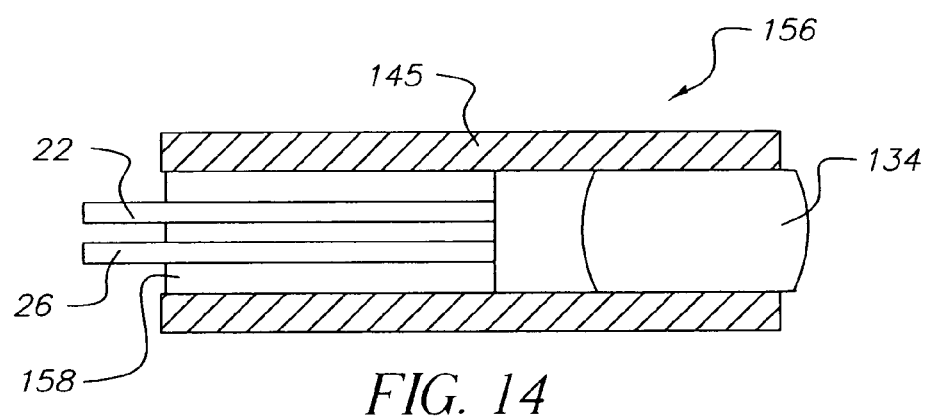
FIG. 14 shows a dual-fiber optical collimator assembly.
Figure 15:
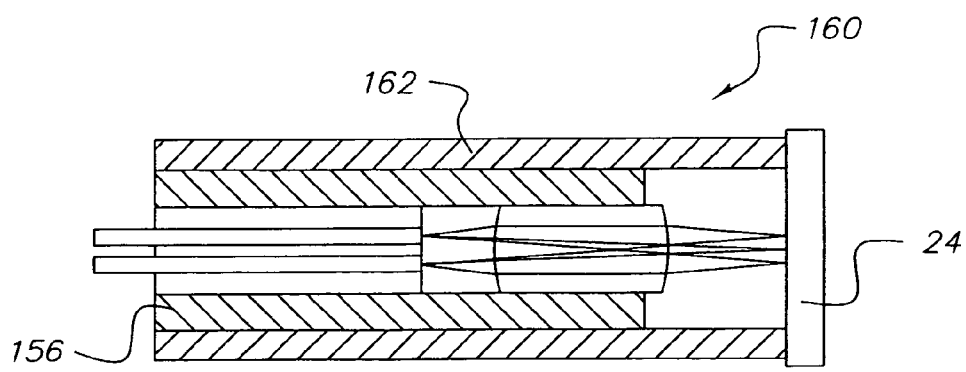
FIG. 15 shows a reflective system using one dual-fiber optical collimator assembly.

The symmetric, bi-aspheric lens can also be used in a dual-fiber collimator assembly 156, shown in FIG. 14. In this embodiment, the two optical fibers 22 and 26 are cemented into a precision capillary tube 158, which is then cemented into a cylindrical tube 145 along with the collimator lens 134. A reflective optical fiber component 160 can also be fabricated using a dual-fiber collimator assembly 156, an optical filter (or mirror) 24, and a cylindrical tube 162, as shown in FIG. 15. In this case, the dual-fiber collimator assembly 156 is cemented into a cylindrical tube 162 and the optical filter (or mirror) 24 is cemented onto one end of the cylindrical tube 162. For maximum coupling efficiency, it is important to cement the dual-fiber collimator assembly 156 into the cylindrical tube 162 such that the optical filter (or mirror) 24 is located at the front focal length of the collimator lens.

Figure 16:
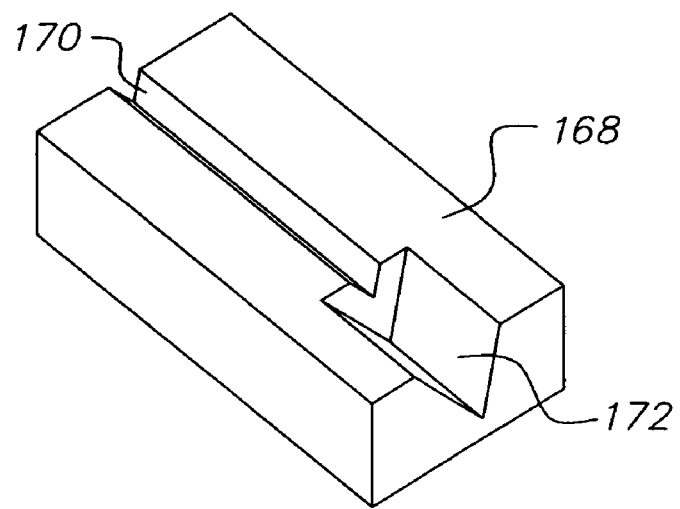
FIG. 16 shows a single v-groove structure.
Figure 17:
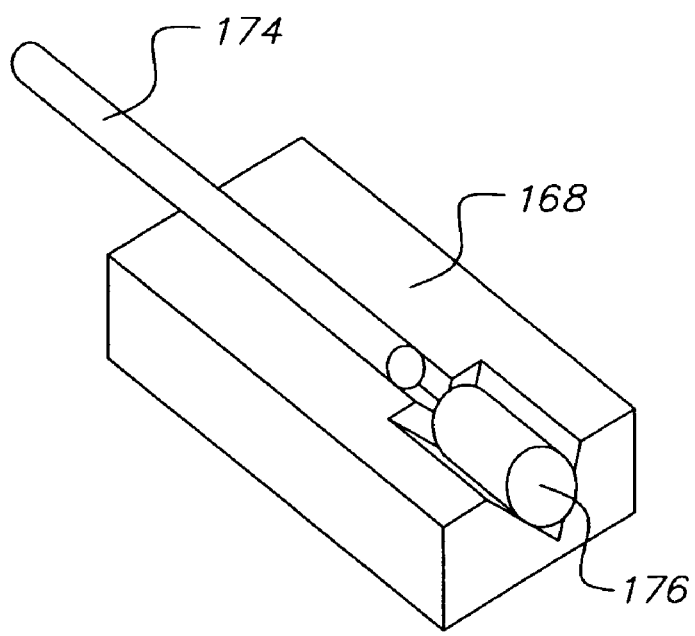
FIG. 17 shows an optical fiber collimator assembly incorporating a precision v-groove.

Other structures, such as precision v-grooves, can be used to passively align and maintain the relative position of the optical fiber to the collimating lens as shown in FIG. 16. In this embodiment, the structure contains a smaller v-groove 170 and a larger v-groove 172 that are precisely aligned to each other. The v-groove structure can be fabricated by machining metal or silicon, anisotropically etching silicon or silica, grinding in metal, or molding in plastic or ceramic. FIG. 17 shows an optical fiber collimator assembly composed of a v-groove structure 168, an optical fiber 174, and a symmetric, bi-aspheric collimator lens 176. The optical fiber and lens can be attached to the v-groove structure with cement, other bonding processes, or mechanically clamped.

Figure 18:
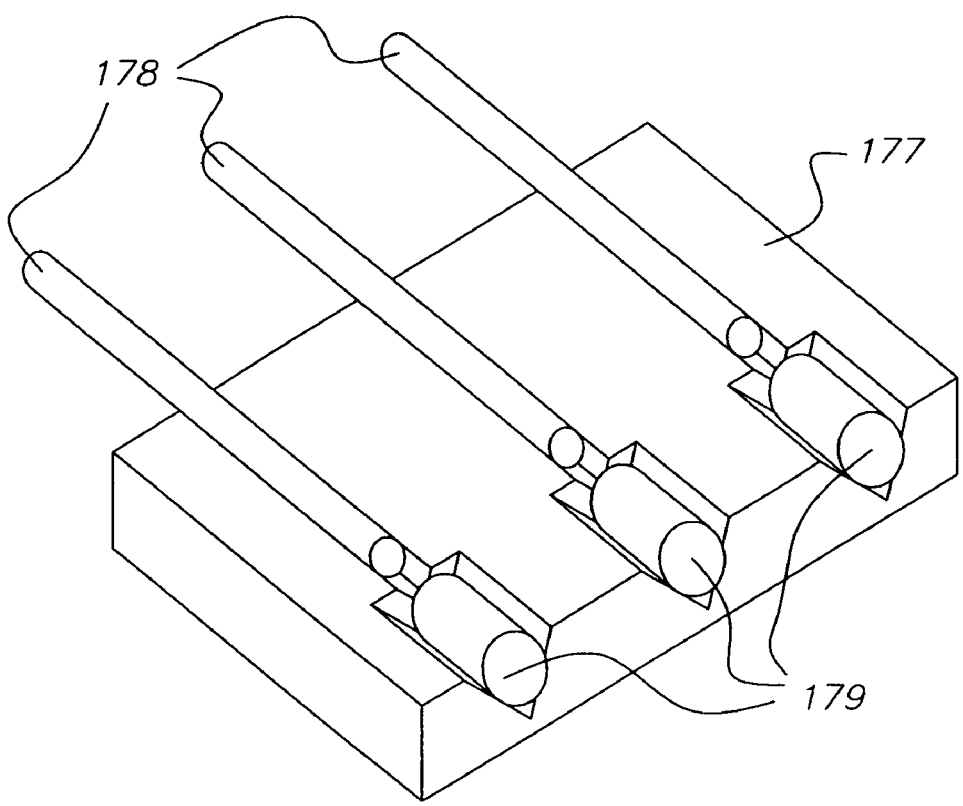
FIG. 18 shows a one-dimensional array of fiber collimator assemblies.
Figure 19:
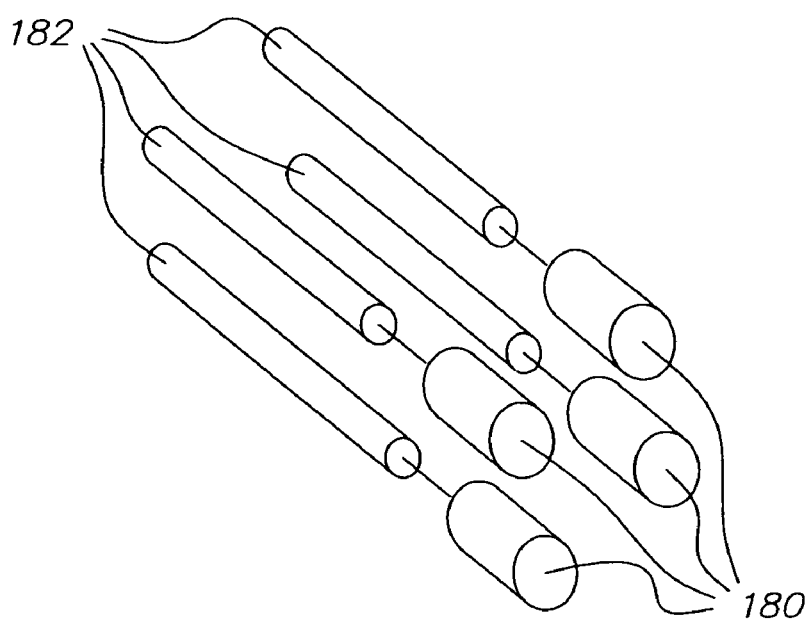
FIG. 19 shows a two-dimensional array of fiber collimator assemblies.

FIG. 18 shows a one-dimensional array of collimator assemblies composed of multiple optical fibers 178 and multiple symmetric, bi-aspheric optical lenses 179 assembled into the array of precision v-grooves 177. Again, the v-groove array structure can be fabricated by machining metal or silicon, anisotropically etching silicon or silica, grinding in metal, or molding in plastic or ceramic. It is also possible to produce a two-dimensional array of collimator assemblies. FIG. 19 shows a 2×2 array of collimator assemblies composed of four optical fibers 182 and four symmetric, bi-aspheric collimator lenses 180. Various structures can be used to passively align and hold the relative position of the optical fibers to the collimator lenses, including v-grooves and cylindrical tubes or holes.

A symmetric, bi-aspheric lens can be used to collimate light from a single-mode or polarization maintaining optical fiber operating over the wavelength range of approximately 1300 to 1625 nm. A symmetric, bi-aspheric lens can also be used to collimate light from a multi-mode optical fiber operating over the wavelength range of approximately 850 to 1300 nm. In each case, the prescription of the optical surfaces, the index of refraction, and the center thickness would be chosen to maximize coupling efficiency.

Convex surfaces 136 and 138 of lens 134 in FIG. 11 can be chosen to have an aspheric shape in order to minimize the aberration of the beam produced by the lens. The shape is commonly specified in the form of a conic equation, where the sag of the surface is given by $$sag = \frac{\frac{y^2}{R}}{1 + \sqrt{1 - (1+k)\frac{y^2}{R^2}}}$$

where R is the base radius of the surface, y is the radial coordinate, and k is the conic constant. If k=0, the surface is a sphere. Equivalent mathematical formulas can be used to describe the same optical surface shape, without changing the effective function of the surface. For the examples presented here, only conical aspheric surfaces were used. However, aspheric surfaces with higher order terms will also produce acceptable results.

For an on-axis object, the particular shape of the asphere can be chosen in order to drive all orders of spherical aberration to zero. An ellipsoidal surface produces an image of an infinite object without any spherical aberration. The conic constant is given by $(-1/n)^2$, where n is the refractive index of the lens. However, the ellipsoid gives perfect imaging only for points imaged on the optical axis. In order to determine the best overall performance and considering the lens must function for both on-axis and off-axis points, the conic constant must be changed in order to achieve the best overall performance. The optimal value of the conic constant is selected by minimizing the average root mean square (rms) of the optical path difference of the on-axis and off-axis field points.

A simplified process for designing symmetric, bi-aspheric, optical fiber collimator lenses is described below. First, a standard effective focal length of 1.944 mm is chosen. A commercially available optical design program, such as CODE V™ from Optical Research Associates, is then used to determine the optimum conic constant, center thickness and radius of curvature for lens material indices of refraction that ranged from 1.5 to 1.9. From this data, linear equations are created to predict how the optimum conic constant, radius of curvature, and center thickness varies with lens material index of refraction. Collimator lenses with nonstandard focal lengths can be designed by simply multiplying the center thickness and the radius of curvature by the ratio of desired focal length to standard focal length. The optimum conic constant, on the other hand, is independent of the effective focal length of the lens. Some additional optimization is required to arrive at the "best" lens design solution for nonstandard effective focal lengths.

PROCESS STEPS

Step 1: Choose a lens material, which will specify the index of refraction, N.

Step 2: Use the following equation to determine the optimal conic constant, k.

$$k = -1.7843*N + 0.6713$$

Note that as the refractive index of the lens material increases, the conic constant decreases in magnitude (or is closer to zero). A conic constant closer to zero means that less aspheric departure is required in order to produce the optimal wavefront. Lower aspheric departure means that fabrication is easier, since as is well known in the art, the difficulty of manufacturing increases with increasing aspherical departure. Conic constants that vary from the optimal values given by the equation above can also be used to produce acceptable coupling efficiency.

Step 3: Calculate the optimum standard radius of curvature, $R_0$, and the optimum standard center thickness, $CT_0$, for the standard effective focal length, $EFL_0$, of 1.944 mm.

$$R_0 = 2.6887*N - 2.4097$$

$$CT_0 = 2.4623*N - 2.0505$$

Step 4: Specify the desired effective focal length, EFL and scale the standard radius of curvature and standard center thickness.

$$R = \frac{EFL}{EFL_0} * R_0$$

$$CT = \frac{EFL}{EFL_0} * CT_0$$

Figure 20:
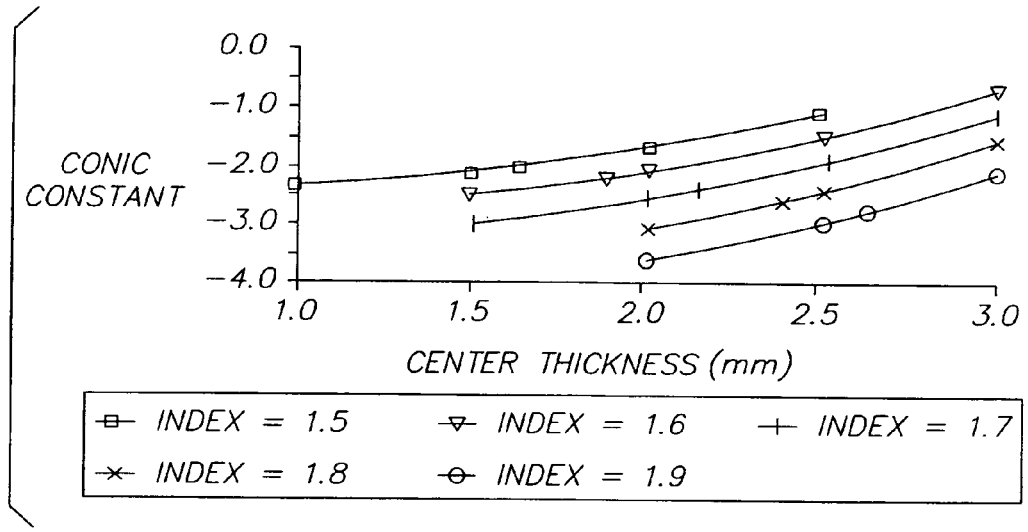
FIG. 20 shows a graph of aspheric conic constant as a function of lens center thickness for a standard focal length of 1.944 mm.
Figure 21:
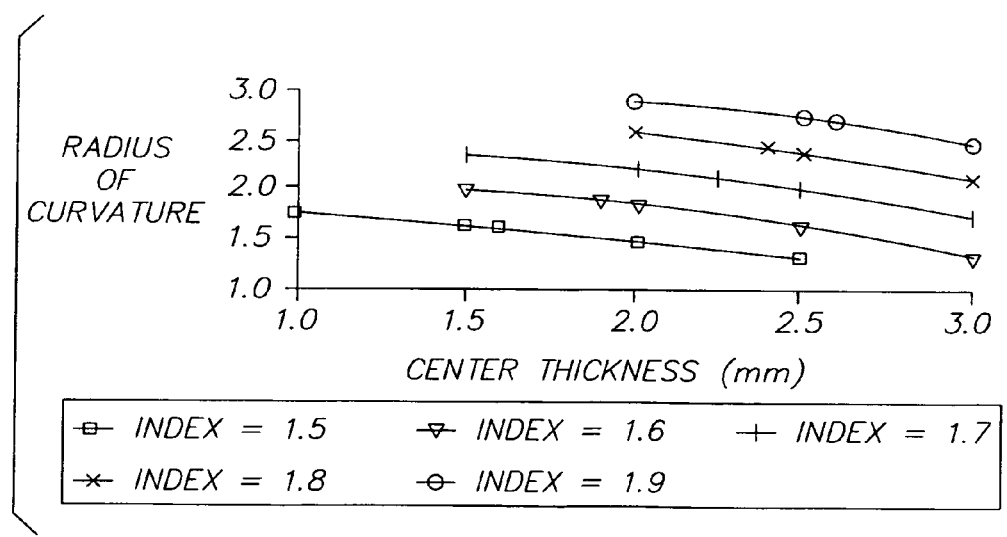
FIG. 21 shows a graph of radius of curvature as a function of lens center thickness for a standard focal length of 1.944 mm.

It can be advantageous to increase the center thickness of the lens to reduce the tilt and decentration errors between the optical fiber and the collimator lens (see FIG. 12). For a given focal length and index of refraction, the center thickness can be lengthened to a point while still producing acceptable coupling efficiency (or insertion loss). FIG. 20 shows a family of curves depicting how the conic constant, k, varies with center thickness, CT, for a standard focal length of 1.944 mm. FIG. 21 shows a family of curves depicting how the radius of curvature, R, varies with center thickness, CT, for a standard focal length of 1.944 mm. Example 4 describes a collimator lens with an increased center thickness. The optimum center thickness for a focal length of 1.944 and an index of refraction of 1.70 is approximately 2.13 mm. The center thickness was increased to 2.50 mm by adjusting the radius of curvature, R=2.0323 mm, and conic constant, k=-1.87767. In this case, the modeled reflected insertion loss was less than 0.01 dB and the measured reflected insertion loss on prototypes lenses averaged 0.07 dB.

The lens can be made of either glass or molded plastic. Glass has greater environmental stability than plastic. Unlike plastic lenses, glass will not change refractive index due to chemical changes or humidity. It is desirable that the homogeneity of the lens material be maintained during the molding process. As is known in the industry, inhomogeneity of the optical material can adversely affect the performance of the lens. It is an advantage of the lens, as compared to gradient index lenses made by diffusion, that no toxic metals such as thallium are used for the diffusion.

It is an advantage of the invention that higher index glasses be chosen for the lens. A higher index lens reduces the strength of the curves needed to provide a given refracting power, hence making manufacturing easier. It is a further advantage that for a higher index material, a single layer optical coating can cause a significant reduction in the amount of light reflected from the lens surface. This is because the optimal choice for the index of a single-layer antireflection coating is equal to the geometric mean of the refractive indices of the two media on each side of the coating. One of the common coating materials is magnesium fluoride, with a refractive index of 1.38. Hence, magnesium fluoride is optimal for a substrate index of 1.90. The closer the substrate refractive index is to 1.90, the better the performance of the single-layer magnesium fluoride coating.

It is a further advantage of this invention that the front focal distance "FF" is shorter than a plano-convex collimator lens. A shorter front focal distance aids in mounting an optical filter or other optical component in a photonic device such as a DWDM demultiplexer. Another advantage of this invention is improved manufacturability and reduced alignment sensitivities due to the equal power on both optical surfaces. Referring to FIG. 11, the Gaussian beam 62 is refracted at both optical surfaces 136 and 138 as it passes through lens 134. This reduces the additional insertion loss caused by manufacturing perturbations, such as center thickness, power, irregularity, tilt of the optical surfaces, and decentration of the optical surfaces. Equal power on both surfaces also reduces performance degradations caused by assembly alignment errors such as lens tilt and decentration.

Figure 1:
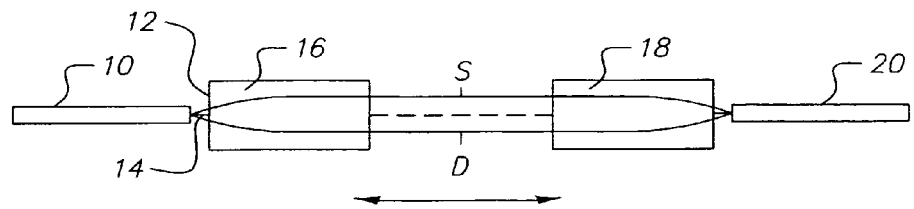
FIG. 1 shows a pair of GRIN collimating lenses being used to couple light from a source fiber into a receiving fiber.
Figure 2:
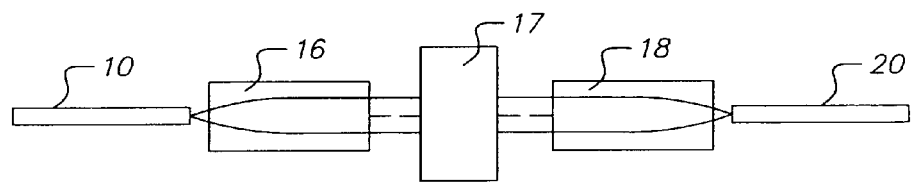
FIG. 2 shows optical components introduced into the collimated beam in order to provide additional processing.
Figure 3:
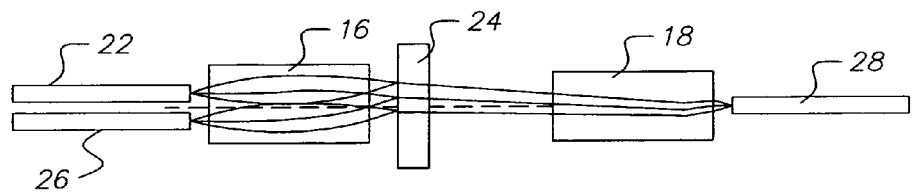
FIG. 3 shows an optical system with a filter to separate out light of different wavelengths.
Figure 4:
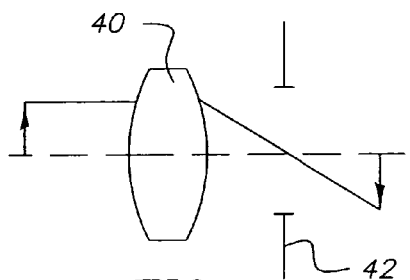
FIG. 4 shows a system telecentric in object space.
Figure 5:
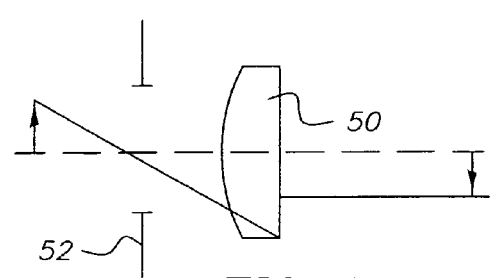
FIG. 5 shows a system telecentric in image space.
Figure 6:
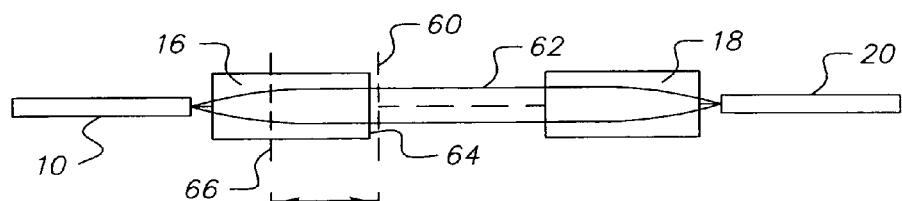
FIG. 6 shows a shows a pair of GRIN collimator lenses being used to couple light from a source fiber into a receiving fiber.

Yet another advantage of the invention is a reduced scratch-dig specification on the first optical surface of the lens. Any cosmetic imperfections, such as scratches or digs, on the optical surfaces within the Gaussian beam profile will cause a reduction in the coupling efficiency. As the beam size on the optical surface decreases, the acceptable size of the scratch or dig also decreases. The distance from the fiber facet to the first optical surface of the GRIN and plano-convex lens is very small—typically 0.25 mm. Referring to FIG. 1, the beam diameter 14 on the first surface 12 of GRIN lens 16 is typically less than 50 micrometers. This is also true for the plano-convex lens as shown in FIG. 7. In this case the beam diameter 82 on the first surface 76 is also less than 50 micrometer. Because the beam diameter on the first optical surface is very small, the size of acceptable scratches and digs also become very small. Now referring to FIG. 11, the beam diameter 132 on the first surface 136 of the symmetric, bi-convex lens 134 will typically be greater than 200 micrometers. As a result, the scratch-dig specification for the first optical surface of the symmetric, bi-aspheric lens will be greatly reduced making manufacturing easier.

Figure 9A:
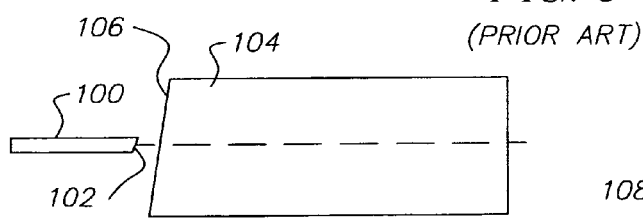
FIG. 9a shows a GRIN lens with inclined facets.
Figure 9B:
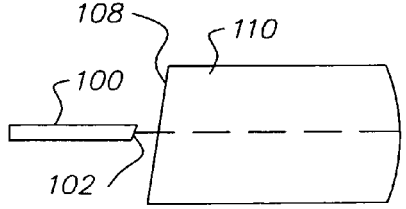
FIG. 9b shows a plano-convex lens with inclined facets.
Figure 10A:
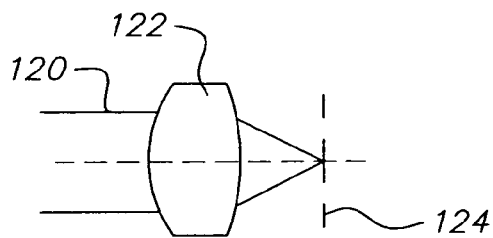
FIG. 10a shows a bi-convex collimator lens shape.
Figure 10B:
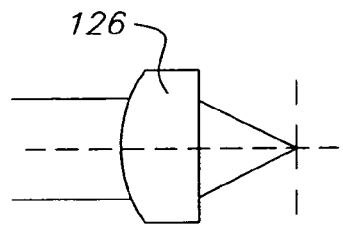
FIG. 10b shows a convex-plano collimator lens shape.
Figure 10C:
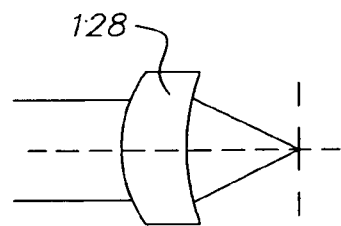
FIG. 10c shows a meniscus collimator lens shape.

To achieve acceptable return loss or back-reflection, the end of the fiber is normally cleaved and the first surface of the collimator lens is typically inclined at 8 degrees. These surfaces are also coated with a high-efficiency anti-reflection coating. FIG. 9(a) shows a GRIN lens 104 with a tilted facet 106, whereas FIG. 9(b) shows a plano-convex lens 110 with a tilted facet 108. It is difficult and costly to manufacture collimator lenses with tilted optical facets. This is particularly true for a glass-molded collimator lens.

Figure 22:
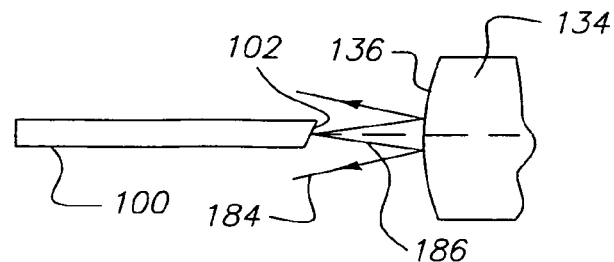
FIG. 22 shows a Gaussian beam reflected off a convex optical surface.

A further advantage of the present invention is the ability to achieve acceptable return loss without the need for a tilted facet. Referring to FIG. 22, a diverging Gaussian beam 186 exits the source fiber 100 through an anti-reflection coated and tilted facet 102. The Gaussian beam 186 continues to diverge until it strikes the first optical surface 136 of lens 134. At this surface a very small amount of light is reflected off the anti-reflection coated surface 136. The convex optical surface 136 also increases the divergence angle of the reflected beam 184. The reflected beam 184 continues to diverge until it reaches the tilted fiber facet 102. At this point the reflected beam 184 is sufficiently large to greatly reduce the amount of light that enters the source fiber 100. Thus the longer back focal distance and the convex optical surface both contribute to reducing the back reflected light to an acceptable level.

Yet another advantage of the present invention is the ease of assembly resulting from the symmetry of the lens. During an assembly procedure, the operator does not have determine which optical surface should be inserted first into a mounting tube or v-groove because each optical surface is identical. This ease in assembly becomes very important as the size of the lens becomes increasing small.

Another advantage of the invention results from the lack of tilted lens facet. Referring again to FIG. 9(a) for example, the tilted fiber facet 102 must be aligned in rotation to the tilted lens facet 106 to achieve optimum coupling efficiency. In some cases the fiber facet and the lens facet need to be aligned as shown in FIG. 9(a). In other cases the fiber facet 102 must be aligned 90 degrees relative to the lens facet 106. The alignment of the fiber facet to the lens facet is known as clocking. The process of clocking alignment can be very time consuming and difficult because of the small size of the components and because of the inaccessibility of the fiber facet and lens facets. Clocking is not required for the present invention because the symmetric bi-aspheric collimator lens does not require a tilted optical facet.

Figure 23:
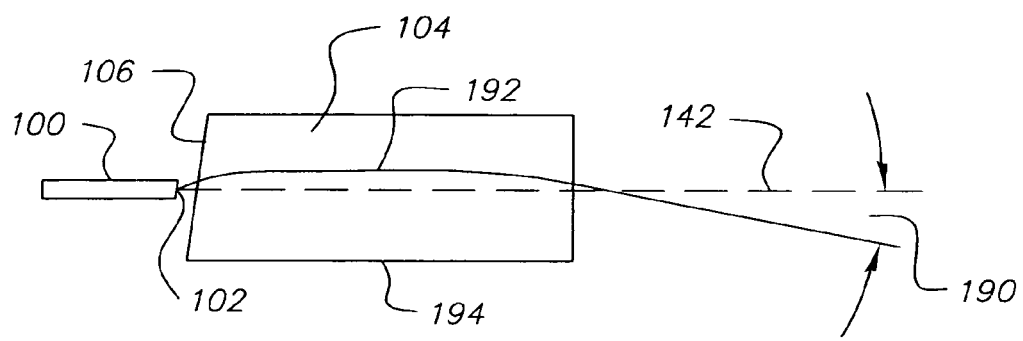
FIG. 23 shows a chief ray propagating through a GRIN lens.
Figure 24:
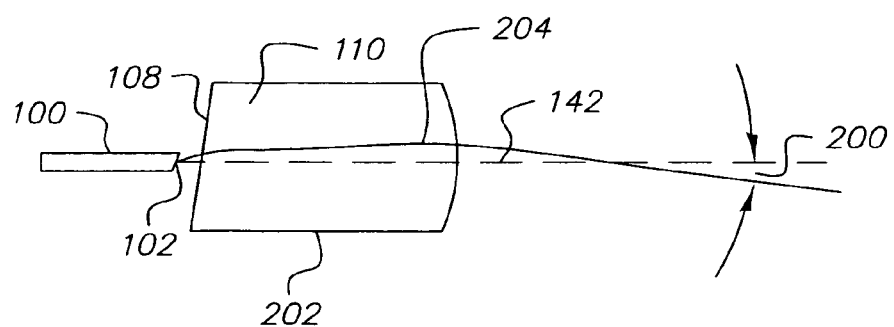
FIG. 24 shows a chief ray propagating through a plano-convex lens.
Figure 25:
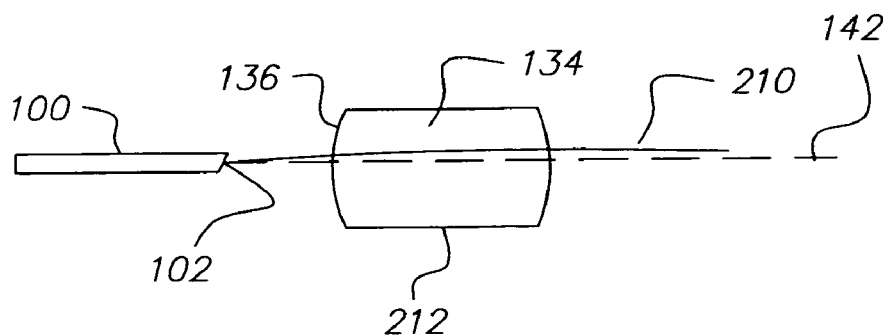
FIG. 25 shows a chief ray propagating through a symmetric bi-convex lens.

The tilted optical facet of the GRIN lens and the plano-convex lens also cause the collimated Gaussian beam to be tilted relative to the optical axis, as shown in FIG. 23 for a GRIN lens. This effect is known as optical pointing. The source fiber 100 has a tilted facet 102 to reduce back-reflection. The chief ray 192 exits the tilted fiber facet 102 at an angle relative to the optical axis 142 of lens 104 and the source fiber 100. The chief ray 192 exits lens 104 and an angle 190 relative to the optical axis 142. The chief ray 190 is also tilted relative to the outside diameter 194 of lens 104. FIG. 24 shows a plano-convex lens 110 with a tilted facet 108. The chief ray 204 also exits the lens 110 at an angle relative to the optical axis 142 and the diameter of the lens 202. Large optical pointing of the Gaussian beam can increase the difficultly of aligning photonic devices due to the inability to achieve "first light" from the source fiber into the receiving fiber. Detection of "first light" is critical during many active alignment processes. The present invention does not suffer from optical pointing because of the lack of tilted optical surface. FIG. 25 shows how the chief ray 210 traverses through a symmetric, bi-aspheric lens 134. The chief ray will nominally exit the lens with zero tilt relative to the optical axis 142 or the outside diameter 212 of the lens. This is yet another advantage of the present invention.

Figure 26A:
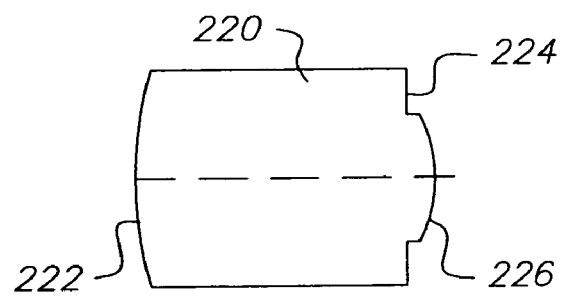
FIG. 26a shows a symmetric bi-convex lens with mounting datums on the second optical surface.
Figure 26B:
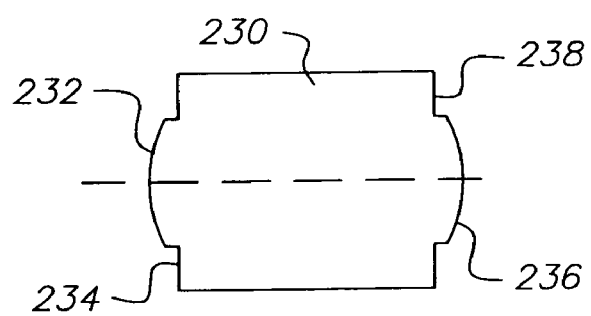
FIG. 26b shows a symmetric bi-convex lens with mounting datums on both optical surfaces.

Mounting datums can also be added to both optical surfaces to aid in alignment as shown in FIGS. 26(a) and (b). FIG. 26(a) shows a symmetric by-convex lens 220 with a flat datum 224 formed in the second optical surface 226. The datum can be formed either during molding or during a secondary centering operation. FIG. 26b shows a lens 230 that has a datum 234 formed in the first optical surface 232 and an additional datum 238 formed in the second optical surface 236. One or both of these datums can be used to align additional optical components such as fiber ferrules, optical filters, and attenuators.

The following examples give specific embodiments of the invention, and are not intended to limit the invention to specific dimensions.

EXAMPLE 1

Example 1 has a symmetric bi-aspheric lens with an effective focal length of 1.944 and an index of refraction=1.50.
Curvature of the first optical surface 1: 0.61903 $mm^{-1}$
Conic constant of the first optical surface: k=−2.000878
Center thickness: 1.64 mm.
Curvature of the second optical surface 1: −0.61903 $mm^{-1}$
Conic constant of the second optical surface: k=−2.000878
Refractive index at 1550 nm: 1.50
Back focal distance: 1.29 mm
Front focal distance: 1.29 mm
Effective focal length of individual lens: 1.944 mm
Specified entrance pupil diameter: 1.0 mm on the convex surface.
Axial rms wavefront error: 0.001 waves.

EXAMPLE 2

Example 2 has a symmetric bi-aspheric lens with an effective focal length of 1.944 and an index of refraction=1.60.
Curvature of the first optical surface 1: 0.527295 $mm^{-1}$
Conic constant of the first optical surface: k=−2.185689
Center thickness: 1.89 mm.
Curvature of the second optical surface 1: −0.527295 $mm^{-1}$
Conic constant of the second optical surface: k=−2.185689
Refractive index at 1550 nm: 1.60
Back focal distance: 1.22 mm
Front focal distance: 1.22 mm
Effective focal length of individual lens: 1.944 mm
Specified entrance pupil diameter: 1.0 mm on the convex surface.
Axial rms wavefront error: 0.001 waves.

EXAMPLE 3

Example 3 has a symmetric bi-aspheric lens with an effective focal length of 1.944 and an index of refraction=1.70.

Curvature of the first optical surface 1: 0.461127 mm$^{-1}$
Conic constant of the first optical surface: k=−2.366173
Center thickness: 2.14 mm.
Curvature of the second optical surface 1: −0.461127 mm$^{-1}$
Conic constant of the second optical surface: k=−2.366173
Refractive index at 1550 nm: 1.70
Back focal distance: 1.15 mm
Front focal distance: 1.15 mm
Effective focal length of individual lens: 1.944 mm
Specified entrance pupil diameter: 1.0 mm on the convex surface.
Axial rmis wavefront error: 0.0008 waves.

EXAMPLE 4

Example 4 has two identical symmetric bi-aspheric lenses. The center thickness of the lens has been increased to minimize tilt and decentration between the optical fiber and the collimator lens.
Curvature of the first optical surface 1: 0.48976 mm$^{-1}$
Conic constant of the first optical surface: k=−1.946435
Center thickness: 2.500 mm.
Curvature of the second optical surface 1: −0.48976 mm$^{-1}$
Conic constant of the second optical surface: k=−1.946435
Refractive index at 1550 nm: 1.7028
Back focal distance: 0.963 mm
Front focal distance: 0.963 mm
Effective focal length of individual lens: 1.944 mm
Specified entrance pupil diameter: 1.0 mm on the convex surface.
Axial rms wavefront error: 0.0027 waves.

The invention has been described in detail with particular reference to preferred embodiments thereof, but it will be understood that variations and modifications can be effected within the scope of the invention.

What is claimed is:

1. A fiber optic apparatus comprising:
a biconvex optical lens having two equivalent aspheric optical surfaces;
an optical fiber approximately located at one of a front focal plane and a back focal plane of the optical lens; and
a structure positioned relative to the optical lens and the optical fiber, wherein the structure maintains the position of the optical lens relative to the optical fiber.

2. The fiber optic apparatus of claim 1, wherein the aspheric optical surfaces are conic.

3. The fiber optic apparatus of claim 2, wherein the conic constant ranges from −0.50 to −3.60.

4. The fiber optic apparatus of claim 1, wherein the aspheric optical surface have a maximum departure from a vertex sphere of from 0.0005 to 0.0040 mm at a diameter of 0.972 mm.

5. The fiber optic apparatus of claim 1, wherein the aspheric optical surfaces are coated with a single layer MgF2 anti-reflection coating.

6. The fiber optic apparatus of claim 1, wherein the aspheric optical surfaces are coated with a multi-layer, dichroic anti-reflection coating.

7. The fiber optic apparatus of claim 1, wherein the aspheric optical surfaces are ground and polished.

8. The fiber optic apparatus of claim 1, wherein the aspheric optical surfaces are molded.

9. The fiber optic apparatus of claim 1, wherein the biconvex optical lens is made from a glass material.

10. The fiber optic apparatus of claim 9, wherein the biconvex optical lens has an index of refraction from 1.50 to 1.90.

11. The fiber optic apparatus of claim 1, wherein the biconvex optical lens is made from a plastic material.

12. The fiber optic apparatus of claim 11, wherein the biconvex optical lens has an index of refraction from 1.40 to 1.60.

13. The fiber optic apparatus of claim 1, wherein the biconvex optical lens has an effective focal length of from 1.50 to 10.0 mm.

14. The fiber optic apparatus of claim 1, wherein the structure is adapted to align the relative position of the optical lens and the optical fiber.

15. The fiber optic apparatus of claim 14, wherein the structure is a v-groove.

16. The fiber optic apparatus of claim 14, wherein the structure is a cylindrical tube.

17. The fiber optic apparatus of claim 1, wherein the optical fiber is a single-mode optical fiber.

18. The fiber optic apparatus of claim 1, wherein the optical fiber is a multi-mode optical fiber.

19. The fiber optic apparatus of claim 1, wherein the optical fiber is a polarization-maintaining optical fiber.

20. The fiber optic apparatus of claim 1, wherein the optical fiber is a solution-doped optical fiber.

21. The fiber optic apparatus of claim 1, the optical fiber being a first optical fiber, the apparatus further comprising:
at least one additional optical fiber approximately located at one of the front focal plane and the back focal plane of the optical lens.

22. A fiber optic apparatus comprising:
a number of biconvex optical lens having two equivalent aspheric optical surfaces;
a number of optical fibers approximately located at one of a front focal plane and a back focal plane of the optical lenses, the number of optical fibers being equal to the number of biconvex optical lenses; and
a structure positioned relative to the optical lenses and the optical fibers, wherein the structure maintains the position of the optical lenses relative to the optical fibers.

23. The fiber optic apparatus of claim 22, wherein the optical lenses and optical fibers are arranged in a one-dimensional pattern.

24. The fiber optic apparatus of claim 22, wherein the optical lenses and optical fibers are arranged in a two-dimensional pattern.

25. The fiber optic apparatus of claim 22, wherein at least one of the optical lenses has a plurality of optical fibers approximately located at one of a front focal plane and a back focal plane of the optical lens.

26. A fiber optic apparatus comprising:
a biconvex optical lens having two equivalent aspheric optical surfaces, wherein the lens has a curvature of the first optical surface of 0.48976 mm$^{-1}$, a conic constant of the first optical surface of k=−1.946435, a center thickness of 2.500 mm, a curvature of the second optical surface of −0.48976 mm$^{-1}$, a conic constant of the second optical surface of k=−1.946435, and a refractive index at 1550 nm of 1.7028.

27. A fiber optic apparatus comprising:
a biconvex optical lens having two equivalent aspheric optical surfaces;

an optical fiber approximately located at one of a front focal plane and a back focal plane of the optical lens; and a structure positioned relative to the optical lens and the optical fiber, wherein the structure maintains the position of the optical lens relative to the optical fiber and the aspheric optical surfaces have a maximum departure from a vertex sphere of from 0.0005 to 0.0040 mm at a diameter of 0.972 mm.

* * * * *